Patented June 15, 1954

2,681,339

UNITED STATES PATENT OFFICE 2,681,339

PYRIMIDINE PENICILLIN

Kunio Yamanaka, Hiroshi Yamamoto, Yoshio Kawamura, and Shimpei Ito, Tokyo, Japan, assignors to Nippon Kayaku Co., Limited, Tokyo, Japan No Drawing. Application June 12, 1953,
Serial No. 361,442

Claims priority, application Japan
December 2, 1950

6 Claims. (Cl. 260—239.1)

The present application is a continuation-in-part of application Serial No. 256,121, filed November 13, 1951, now abandoned.

The invention relates to crystalline salts 2-amino pyrimidine and penicillin, these salts having the general formula

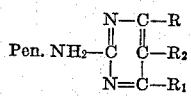

wherein Pen. designates an acid penicillin radical, R and $R_1$ designate radicals selected from the group consisting of H, lower alkyl and lower alkoxy, and $R_2$ designates a radical selected from the group consisting of H and lower alkyl.

An object of the invention is to provide crystalline 2-amino pyrimidine penicillin salts for therapeutic application as slow release penicillin compounds of superior and improved characteristics which include improvements with respect to the criteria of:

1. Ease of administration both hypodermic and oral;
2. Absence of toxicity;
3. Maintenence of prolonged and high blood level concentrations after intravenous injections;
4. High retention and high blood level after intramuscular injections;
5. Resistance to deterioriation on storage and lower hygroscopicity, and
6. Protective action against pneumococcal infection.

A further object of the invention is to provide for the production of new and therapeutically useful solid penicillin salts of 2-amino pyrimidines by the precipitation of penicillin from a fermentation broth, an aqueous solution of penicillin or its easily soluble salts (alkali metal or ammonium salts), or an organic solvent solution of penicillin, in such solvents as ethyl, propyl, butyl or amyl acetate or ether etc., by the addition of an equivalent amount of a 2-amino pyrimidine based upon the penicillin content of the solution.

Other and further objects of the present invention will appear from the more detailed description set forth below, it being understood that such detailed description is given by way of illustration and explanation only and not by way of limitation, since various changes therein may be made by those skilled in the art without departing from the scope and spirit of the present invention.

We have found that any member of the 2-amino pyrimidine group (a monoamino pyrimidine group which has the $NH_2$ group in the second position of the pyrimidine nucleus) reacts at cooled or normal temperatures with a penicillin salt in an organic solvent of one member selected from a group consisting of ether, ethyl acetate, butyl acetate and amyl acetate and precipitates a crystalline salt which is stable and resistant to decomposition in air at normal temperatures. We have also discovered that the salt of a mineral acid such as hydrochloric acid reacts with these 2-amino pyrimidines and that a penicillin salt such as of sodium or alkali metal reacts with the 2-amino pyrimidine in water at cooled or normal temperatures and precipitate crystalline salts similar to these mentioned above. Having investigated these reactions, we have found a method which is suitable for the industrial production of the crystalline penicillin salts as mentioned above.

When these 2-amino pyrimidines are added to the penicillin solution in an organic solvent while it is being stirred at cooled or normal temperatures, it dissolves and then the crystals of the desired salt gradually precipitate. This precipitate is separated and removed. The solvent is removed under reduced pressure from the solvent wet precipitate.

When the 2-amino pyrimidine as above is put into a solution of the same organic solvent and penicillin is added, the same result can be brought about.

Further, when a salt of the 2-amino pyrimidine above indicated is added to the aqueous solution of the salt of penicillin such as is mentioned above while being stirred at cooled or normal temperatures, the salt of the 2-amino pyrimidine dissolves and then the crystals of the desired salt are deposited. Said crystals of the salt are separated, and dried under reduced pressure.

In this case, when the salt of the 2-amino pyrimidine is added as an aqueous solution, the same result can be obtained.

The products thus obtained are not only effective as medicines but also are pure enough to produce salt of metals such as sodium, potassium, calcium, aluminum etc. of penicillin G.

The 2-amino pyrimidine necessary to carry out this process is a member selected from a group consisting of 2-amino pyrimidine, 2-amino-4-methyl pyrimidine, 2-amino-4-methyl-6-methoxy pyrimidine, 2-amino-4-methyl-6-ethoxy pyrimidine, 2-amino-4,6-dimethoxy pyrimidine, 2-amino-4-methoxy pyrimidine, 2-amino-4,6-dimethyl pyrimidine and 2-amino-4,5-dimethyl-6-methoxy pyrimidine and is not industrially of any difficult composition. Therefore, this process is advantageous as a process of producing crystalline penicillin salt.

The potency, melting point, angle of rotation and elemental analysis value of each refined penicillin salt of the 2-amino-pyrimidine group produced as mentioned above are shown in Table I which follows:

TABLE I

| 2-amino pyrimidine group | Oxford Unit Measured | Calculated | Melting Point, °C. | Ref. No. |
|---|---|---|---|---|
| 2-amino pyrimidine | 1,420 | 1,383 | 94 | 1 |
| 2-amino-4-methyl pyrimidine | 1,380 | 1,340 | 106 | 2 |
| 2-amino-4-methyl-6-methoxy pyrimidine | 1,360 | 1,254 | 144 | 3 |
| 2-amino-4-methyl-6-ethoxy pyrimidine | 1,230 | 1,220 | 120 | 4 |
| 2-amino-4-6-dimethoxy pyrimidine | 1,420 | 1,213 | 130.5 | 5 |
| 2-amino-4-methoxy pyrimidine | 1,130 | 1,292 | 100 | 6 |
| 2-amino-4-6-dimethyl pyrimidine | 1,310 | 1,298 | 98 | 7 |
| 2-amino-4-5-dimethyl-6-methoxy pyrimidine | 1,260 | 1,220 | 129 | 8 |

| ref. No. | Angle of Rotation [α] Methanol Solution | Analysis Values of Elements | | | | | |
|---|---|---|---|---|---|---|---|
| | | Calculated | | | Measured | | |
| | | C, Percent | H, Percent | N, Percent | C, Percent | H, Percent | N, Percent |
| 1 | $[\alpha]_D^{15.5} = +225°$ | 55.93 | 5.39 | 16.31 | 54.87 | 5.69 | 15.67 |
| 2 | $[\alpha]_D^{15.0} = +193°$ | 56.97 | 5.68 | 15.71 | 55.13 | 5.68 | 15.55 |
| 3 | $[\alpha]_D^{15.0} = +216°$ | 55.80 | 5.74 | 14.76 | 55.75 | 5.94 | 14.70 |
| 4 | $[\alpha]_D^{15.0} = +182°$ | 56.50 | 6.00 | 14.37 | 56.52 | 6.05 | 14.67 |
| 5 | $[\alpha]_D^{17.0} = +200°$ | 53.98 | 5.56 | 14.31 | 54.17 | 5.50 | 14.83 |
| 6 | $[\alpha]_D^{17.0} = +218°$ | 54.89 | 5.49 | 15.24 | 54.62 | 5.53 | 15.22 |
| 7 | $[\alpha]_D^{15.0} = +205°$ | 57.75 | 5.95 | 15.31 | 58.02 | 5.93 | 15.43 |
| 8 | | 56.66 | 6.00 | 14.37 | 56.58 | 6.07 | 14.49 |

Example 1

40 c. c. of penicillin-butyl acetate solution (contained 3.7 g. of penicillin acid) is cooled with ice under stirring, to which a solution of 1.09 g. of 2-amino-4-methyl pyrimidine dissolved in 70 c. c. of butyl acetate is added. The colorless crystalline precipitates thus formed is filtered and dried at the temperature below 5° C. under reduced pressure to result in obtaining 4.2 g. (96.5% of theory) of 2-amino-4-methyl-pyrimidine salt of penicillin having melting point (decompose 101° C. Potency 1360 u./mg. (found) 1340 u./mg. (calculated).

Example 2

A solution of 1.76 g. of 2-amino-4-methyl-6-methoxy-pyrimidine hydrochloride dissolved in 25 c. c. of water is added, with stirring, to a solution of 4 g. of penicillin-sodium salt dissolved in 33 c. c. of water cooled to 0° C.–10° C. Vigorous stirring of the resulting mixture at 0° C.–5° C. is followed by the formation of colorless crystalline precipitates, which is then separated by filtration, washed with cold water and dried at an atmospheric temperature under reduced pressure, whereupon 4.4 g. of 2-amino-4-methyl-6-methoxy-pyrimidine salt of penicillin acid is obtained. Yield 93% of theory. Potency 1260 u./mg. (found), 1254 u./mg. (calculated).

Example 3

When respective butyl acetate solutions of the 2-amino pyrimidine group prepared as prescribed in the following Table II are added while being stirred to the butyl acetate solution of penicillin of the same composition and quantity as in Example 1 prepared and kept at 0° to 15° C., corresponding penicillin salt is obtained with the results shown in Table II, which follows:

TABLE II

| 2-amino pyrimidine group | Quantity used, g. | Butyl acetate, cc. | Yield of corres. penicillin salt, g. | Percentage of yield to theoretical value, percent | Melting point (decomposition), °C. |
|---|---|---|---|---|---|
| 2-amino pyrimidine | 0.95 | 40 | 4.0 | 93 | 92.5 |
| 2-amino-4-methyl-6-methoxy pyrimidine | 1.39 | 120 | 4.5 | 95 | 140 |
| 2-amino-4-methyl-6-ethoxy pyrimidine | 1.53 | 0 | 4.5 | 92.5 | 117 |
| 2-amino-4-6-dimethoxy pyrimidine | 1.55 | 50 | 4.9 | 100 | 130.5 |
| 2-amino-4-methoxy pyrimidine | 1.25 | 30 | 4.2 | 91.5 | 100 |
| 2-amino-4-6-dimethyl pyrimidine | 1.23 | 40 | 4.3 | 93 | 97.5 |
| 2-amino-4-5-dimethyl-6-methoxy pyrimidine | 1.53 | 100 | 4.6 | 94 | 127.5 |

In case amyl acetate is used instead of butyl acetate in the above Example 3, in order to prepare a penicillin solution, the same quantity as of butyl acetate is used and, in order to prepare solutions of the 2-amino pyrimidine group, a quantity 1.1 times as large as of butyl acetate is used; in case ethyl acetate is used instead of butyl acetate, in order to prepare a penicillin solution, the same quantity as of butyl acetate is used, and, in order to prepare solutions of the 2-amino pyrimidine group, a quantity 0.5 times as large as of butyl acetate is used; in case ether is used instead of butyl acetate, in order to prepare a penicillin solution, the same quantity as of butyl acetate is used, and in order to prepare solutions of the 2-amino pyrimidine group, a quantity 1.2 times as large as of butyl acetate is used, and then the yields are respectively approximate to those in the case of Example 3.

In the above example, even if the solvent required to dissolve any member of the 2-amino pyrimidine group is added first to the penicillin solution and then the member of the 2-amino pyrimidine group is added later in a state of crystalline powder, no effects on results are observed.

Example 4

An aqueous solution of hydrochloride of any member of the 2-amino pyrimidine group such as is shown in the following Table III is separately prepared and is added to an aqueous solution of penicillin sodium salt of the same composition and quantity as in Example 3 prepared and kept at 0° to 15° C. When the mixture is stirred, a white crystallin precipitate is deposited. When the precipitate is separated by filtration, washed with cold water and dried at the normal temperature and reduced pressure, a corresponding penicillin salt of the results as shown in Table III are obtained. Table III follows:

TABLE III

| 2-amino pyrimidine group | Quantity of hydrochloride, g. | Quantity of aqueous solution, cc. | Yield of corres. penicillin salt, g. | Percentage of yield to theoretical value, percent | Melting point (decomposition), °C. |
|---|---|---|---|---|---|
| 2-amino pyrimidine | 1.32 | 20 | 2.8 | 65 | 92 |
| 2-amino-4-methyl pyrimidine | 1.45 | 20 | 3.6 | 82 | 101 |
| 2-amino-4-methyl-6-ethoxy pyrimidine | 1.90 | 25 | 4.3 | 88 | 117 |
| 2-amino-4-6-dimethoxy pyrimidine | 1.92 | 25 | 4.5 | 92 | 130 |
| 2-amino-4-methoxy pyrimidine | 1.62 | 25 | 4.1 | 89 | 99.5 |
| 2-amino-4-6-dimethyl pyrimidine | 1.60 | 25 | 4.1 | 89 | 97.5 |
| 2-amino-4-5-dimethyl-6-methoxy pyrimidine | 1.90 | 25 | 4.5 | 92 | 127 |

In case penicillin potassium salt is used instead of the penicillin sodium salt of this example, a solution with 4.0 g. of penicillin potassium salt dissolved in about 30 c. c. of water is used. In case penicillin N-ethyl piperidine salt is used instead of penicillin sodium salt, a solution with 4.5 g. of penicillin N-ethyl piperidine salt dissolved in about 40 c. c. of water is used. Then, results respectively approximate to the above were obtained.

Further, in case sulphate is used instead of the hydrochloride of the 2-amino pyrimidine group in the above example, the quantity of sulphate corresponding to that of hydrochloride in the above Table III is used as in Table IV, below.

TABLE IV

| 2-amino pyrimidine group | Quantity of Sulphate in g. |
|---|---|
| 2-amino pyrimidine | 1.44 |
| 2-amino-4-methyl pyrimidine | 1.57 |
| 2-amino-4-methyl-6-methoxy pyrimidine | 1.88 |
| 2-amino-4-methyl-6-ethoxy pyrimidine | 2.02 |
| 2-amino-4-6-dimethoxy pyrimidine | 2.04 |
| 2-amino-4-methoxy pyrimidine | 1.74 |
| 2-amino-4-6-dimethyl pyrimidine | 1.72 |
| 2-amino-4-5-dimethyl-6-methoxy pyrimidine | 2.02 |

The results of this case are approximate to those of the case of using hydrochloride. No effects by the change of acid composition are observed.

Below is summarized the utility of 2-amino-4-methyl pyrimidine penicillin and 2-amino-4-methyl-6-methoxy pyrimidine penicillin, produced according to this invention as distinct from other penicillin salts. The above mentioned two types of penicillin salts are characterized by the fact that they do not have such feeble narcotization as of procaine penicillin hitherto extensively used but are remarkably little toxic and hygroscopic.

Results of toxicity tests (1) *Case of oral administration.*—The penicillin salt suspended in 1% C. M. C. (carboxy methyl cellulose) solution was administered to mice by using gastric stylet. The results were observed after 24 hours, 48 hours and 5 days.

[+ alive; − dead.]

| Mice | First Mouse | | | Second Mouse | | | Third Mouse | | |
|---|---|---|---|---|---|---|---|---|---|
| | Weight (g.) | Dosage (mg.) | Result | Weight (g.) | Dosage (mg.) | Result | Weight (g.) | Dosage (mg.) | Result |
| Penicillin Salts: | | | | | | | | | |
| 2-amino-4-methyl pyrimidine penicillin | 12 | 60 | + | 12 | 60 | + | 11 | 55 | + |
| 2-amino-4-methyl-6-methoxy pyrimidine penicillin | 11 | 55 | + | 11 | 55 | + | 11 | 55 | − |

The weight of 5 mg. per g. body weight is equivalent to 300 g. for 60 kg. of a human body.

(2) *Case of hypodermic injection.*—The penicillin salt suspended in sterilized 1% C. M. C. solution was injected under the skin on the back of each mouse. The number of mice which had tolerated the tests in five days was checked.

| Number of Animals Tested | 5 | | | 10 |
|---|---|---|---|---|
| Dosage per g. body weight | 1 mg. | 3 mg. | 5 mg. | 3 mg. |
| Penicillin Salts: | | | | |
| 2-amino-4-methyl pyrimidine penicillin G | 5 | 4 | 1 | 8 |
| 2-amino-4-methyl-6-methoxy pyrimidine penicillin G | 5 | 3 | 1 | 8 |
| Procaine penicillin G | 5 | 2 | 2 | 6 |

Results of hygroscopicity tests

Rates of hygroscopicity in a container saturated with steam at 20° C.:

| Penicillin Salts | Weight (mg.) | Rates of Weight Increase (Percent) | | |
|---|---|---|---|---|
| | | 24 hours | 48 hours | 72 hours |
| 2-amino-4-methyl pyrimidine penicillin G | 303.61 | 0.033 | 0.261 | 0.627 |
| 2-amino-4-methyl-6-methoxy pyrimidine penicillin G | 299.87 | 0.123 | 0.157 | 0.213 |
| Procaine penicillin G | 30.228 | 0.060 | 0.248 | 0.963 |

Those penicillin salts which have the above-mentioned features show effective blood levels for time sufficient for therapy as shown in the following when they are administered to human bodies.

*Blood levels*

(1) Average values in u./cc. of blood levels after 300,000 units of penicillin in oil were injected into human muscles:

| Time in hours | 1 | 3 | 6 | 12 | 24 | 48 |
|---|---|---|---|---|---|---|
| Penicillin Salts: | | | | | | |
| 2-amino-4-methyl-pyrimidine penicillin | 0.6 | 0.5 | | 0.3 | | 0.03 |
| 2-amino-4-methyl-6-methoxy pyrimidine | 1.26 | 1.23 | 0.53 | 0.29 | 0.14 | Trace |

(2) Results of measuring blood levels in the case of administering every three hours (without restriction of meals) 200,000 units of 2-amino-4-methyl-6-methoxy pyrimidine penicillin G preparation (containing deposited calcium carbonate as a buffer agent):

| Time in hrs | 0.5 | 1 | 1.5 | 2 | 3 | 4 | 5 | 6 | 7 |
|---|---|---|---|---|---|---|---|---|---|
| Diseases: | | | | | | | | | |
| 1 | 0.15 | | 0.45 | | 0.13 | 0.51 | | 0.51 | |
| 2 | | 0.45 | | 0.56 | 0.29 | 0.26 | | 0.21 | |
| 3 | 0.02 | 0.17 | | 0.15 | 0.00 | 0.15 | | 0.00 | 0.18 |
| 4 | 0.22 | | 0.52 | | 0.26 | | 0.46 | 0.33 | |
| 5 | | | | | 0.02 | | 0.22 | | |
| Average | 0.12 | 0.32 | 0.53 | 0.35 | 0.13 | 0.30 | 0.34 | 0.16 | |

The results of comparing the effects of preventing pneumococcal infection of orally administered 2-amino-4-methyl-6-methoxy pyrimidine penicillin which is one of the two types of penicillin salts according to this invention and which has especially low hygroscopicity with those of procaine penicillin and penicillin G–Na salt show that the former is superior to the latter two.

be effectively used together. (See literature J. A. P. A. 38 544–6 (1949) as regards the production of para-amino benzoic acid within the body by the administration of procaine penicillin.)

(2) There is no fear of allergy by procaine.

Like results on toxicity, on tolerance, on hygroscopicity, on blood levels, on lack of allergy and on protective effect against pneumococcal infection (oral administration) are obtained with the other 2-amino pyrimidines of the tables and with those as set forth in the general formula

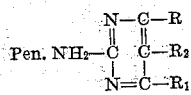

wherein Pen. designates an acid penicillin radical, R and $R_1$ designate radicals selected from the group consisting of H, lower alkyl and lower alkoxy, and $R_2$ designates a radical selected from the group consisting of H and lower alkyl.

What we claim is:

1. A crystalline salt of a 2-amino pyrimidine and penicillin wherein the 2-amino pyrimidine is of the general formula

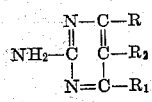

wherein R and $R_1$ designate radicals selected from the group consisting of H, lower alkyl and lower alkoxy, and $R_2$ designates a radical selected from the group consisting of H and lower alkyl.

2. 2-amino-4-methyl pyrimidine penicillin.
3. 2-amino-4-methyl-6-methoxy pyrimidine penicillin.
4. 2-amino-4-5-dimethyl-6-methoxy pyrimidine penicillin.
5. 2-amino-4-6-dimethoxy pyrimidine penicillin.
6. 2-amino-4-methyl-6-ethoxy pyrimidine penicillin.

PROTECTIVE EFFECT AGAINST PNEUMOCOCCAL INFECTION (ORAL ADMINISTRATION)

| Penicillin Salts | Dosage, u. | Observation days and Number of Deaths | | | | | | | | | | Total of Deaths | Average living days |
|---|---|---|---|---|---|---|---|---|---|---|---|---|---|
| | | 1 | 2 | 3 | 4 | 5 | 6 | 7 | 8 | 9 | 10 | | |
| 2-amino-4-methyl-6-methoxy-pyrimidine penicillin | 100 | | | 1 | 1 | | 1 | | | | | 3 | 8.3 |
| | 50 | | 3 | 2 | 1 | | | | | | | 6 | 5.3 |
| | 25 | | 7 | 1 | 1 | | | | | | | 9 | 3.1 |
| Procaine penicillin | 100 | | | 3 | 2 | 1 | | 1 | | | | 7 | 5.2 |
| | 50 | | 8 | | 1 | | | | | | | 9 | 3.0 |
| | 25 | | 6 | 2 | | | | | | | | 8 | 3.8 |
| Penicillin G–Na | 100 | | 5 | 2 | 1 | | | | | | | 8 | 4.0 |

Organisms for test: Pneumococcus Type I.
Amount of inoculated strains: 100 MLD.
Test animals: Groups of 10 mice each weighing 15 to 20 g. were used.

Further, the points in respect of which the new penicillin salts are considered to be superior to procaine penicillin are that:

(1) As no antigen against sulfonamide is produced in the body after administration, they can References Cited in the file of this patent

UNITED STATES PATENTS

| Number | Name | Date |
|---|---|---|
| 2,545,962 | Lott et al. | Mar. 20, 1951 |
| 2,585,432 | Buckwalter | Feb. 12, 1952 |